US 10,851,837 B2

(12) United States Patent
Tsuruta et al.

(10) Patent No.: US 10,851,837 B2
(45) Date of Patent: Dec. 1, 2020

(54) SWING BEARING

(71) Applicant: NIPPON THOMPSON CO., LTD., Tokyo (JP)

(72) Inventors: Kenichiro Tsuruta, Mino (JP); Shinji Oishi, Mino (JP); Masao Kondo, Mino (JP); Koji Obara, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 16/364,440

(22) Filed: Mar. 26, 2019

(65) Prior Publication Data
US 2019/0316633 A1   Oct. 17, 2019

(51) Int. Cl.
| F16C 33/58 | (2006.01) |
| F16C 19/36 | (2006.01) |
| F16C 33/60 | (2006.01) |
| F16C 19/16 | (2006.01) |
| F16C 33/64 | (2006.01) |

(52) U.S. Cl.
CPC .......... *F16C 33/588* (2013.01); *F16C 19/166* (2013.01); *F16C 19/362* (2013.01); *F16C 33/586* (2013.01); *F16C 33/60* (2013.01); *F16C 33/64* (2013.01)

(58) Field of Classification Search
CPC .... F16C 19/166; F16C 19/362; F16C 33/586; F16C 33/588; F16C 33/60; F16C 33/64
See application file for complete search history.

(56) References Cited

U.S. PATENT DOCUMENTS

| 4,362,344 A | * | 12/1982 | Lederman | ............. | F16C 19/166 384/482 |
| 4,368,932 A | * | 1/1983 | Wolzenburg | .......... | F16C 19/362 384/607 |
| 4,722,616 A | * | 2/1988 | Lederman | ............. | F16C 19/166 384/482 |

FOREIGN PATENT DOCUMENTS

| JP | 06349618 A | 12/1994 |
| JP | 2009180268 A | 8/2009 |
| JP | 2017044268 A | 3/2017 |

* cited by examiner

*Primary Examiner* — James Pilkington
(74) *Attorney, Agent, or Firm* — Browdy and Neimark, PLLC

(57) ABSTRACT

A swing bearing allows a reduction in thickness, weight, and manufacturing cost by fixing together a pair of split rings each formed of a plate member to form an outer ring, and fixing together a pair of split rings each formed of a plate member to form an inner ring. The outer ring is composed of a pair of split rings which are obtained by splitting the outer ring at an axially midpoint of the first raceway groove, are formed of respective plate members, and are fixed together. The inner ring is composed of a pair of split rings which are obtained by splitting the inner ring at an axially midpoint of the second raceway groove, are formed of respective plate members, and are fixed together.

8 Claims, 11 Drawing Sheets

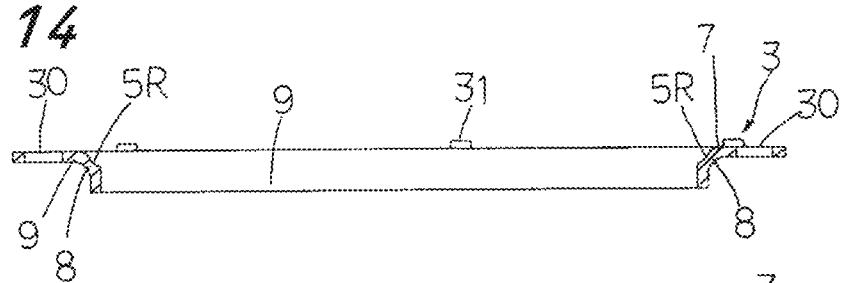
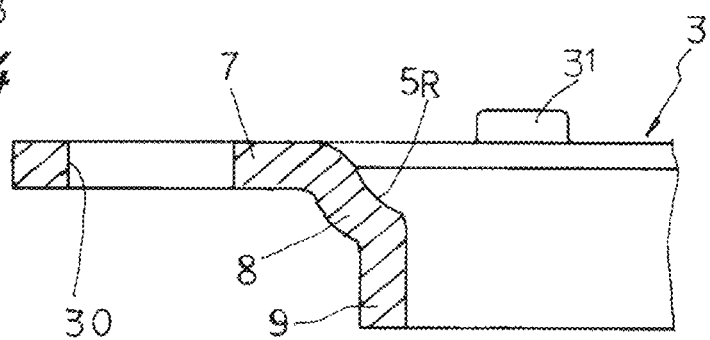
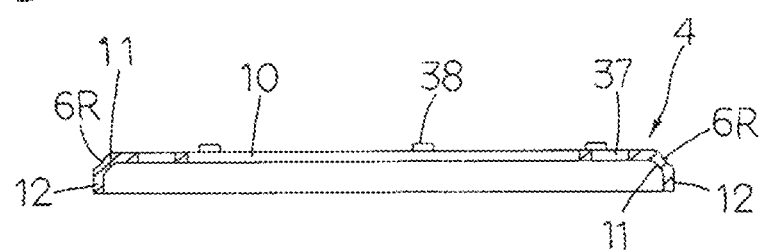
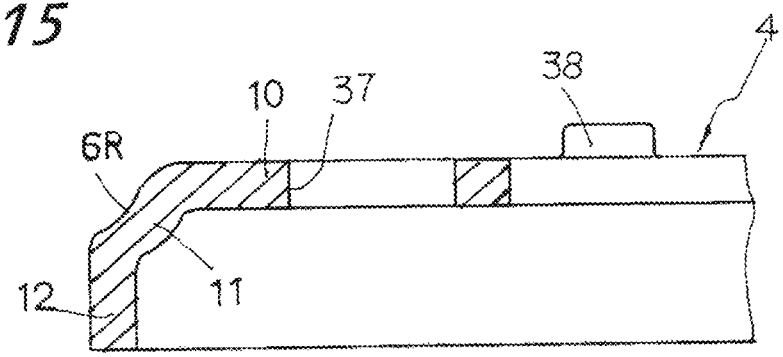

SWING BEARING

FIELD OF THE INVENTION

The present invention relates to a swing bearing which includes, for example, an outer ring, an inner ring rotatable in relation to the outer ring, and rolling elements disposed between the outer ring and the inner ring and in which, in order to reduce thickness to a greatest possible extent, each of the outer ring and the inner ring is composed of split rings which are formed by press working and are fixed together.

BACKGROUND OF THE INVENTION

In recent years, swing bearings are used in turning or rotating sections subjected to combined loads, such as joint sections, swinging sections, and oscillating sections, of various kinds of apparatus such as industrial robots, measuring and inspecting apparatus, medical instruments, and optical instruments. Swing bearings of various types and sizes are produced on a commercial basis according to applications. The swing bearings are requested to reduce in size, weight, thickness, and manufacturing cost and to have dust resistance and provide prevention of grease leakage for certain applications. Even compact cross roller bearings capable of bearing load are requested to reduce in size, weight, and thickness.

Conventionally, a swing bearing manufactured by press working has been known. The swing bearing includes an inner ring having an inner-ring-side rolling-element rolling surface on an outer circumferential surface thereof, an outer ring having an outer-ring-side rolling-element rolling surface on an inner circumferential surface thereof with the outer-ring-side rolling-element rolling surface disposed externally of the inner ring in such a manner as to face the inner-ring-side rolling-element rolling surface, and a plurality of rolling elements disposed in a rollable manner in a rolling-element rolling passage defined by the outer-ring-side rolling-element rolling surface and the inner-ring-side rolling-element rolling surface. Each of the inner ring and the outer ring includes a press-worked portion whose outer shape is formed by press working, and a removal-machined portion formed by removal machining and including the outer-ring-side rolling-element rolling surface and the inner-ring-side rolling-element rolling surface (see, for example, Japanese Patent Application Laid-Open No. 2017-44268).

Also known is a rolling bearing for pump in which an inner ring and an outer ring are formed from a pipe material by cold rolling machining. The rolling bearing for pump is disposed between a cylindrical housing and a rotating shaft of the pump and includes an outer ring having an arc-shaped outer rolling surface formed along an inner circumference thereof, an inner ring having an arc-shaped inner rolling surface formed along an outer circumference thereof and facing the outer rolling surface, and a plurality of balls disposed in a rollable manner between the inner ring and the outer ring via a retainer. The inner ring and the outer ring are formed from a corrosion-proof steel plate through plastic working (see, for example, Japanese Patent Application Laid-Open No. 2009-180268).

Conventionally, there is also known a cross roller bearing in which an outer ring is composed of split rings which can be firmly assembled together. The cross roller bearing includes an inner ring having a raceway groove and an engagement surface on an outer circumferential surface thereof, an outer ring having a raceway groove and an engagement surface on an inner circumferential surface thereof to be engaged with the inner ring, and a large number of rollers rolling in a load-carrying race defined by the raceway groove of the inner ring and the raceway groove of the outer ring. The outer ring is split into two split rings with respect to the axial direction (see, for example, Japanese Patent Application Laid-Open No. H06-346918).

In manufacture of the swing bearing disclosed in Japanese Patent Application Laid-Open No. 2017-44268, the rolling-element rolling passage is formed through press working and removal machining; therefore, the manufacturing process has a room for improvement with respect to reduction in manufacturing cost. Incidentally, a conventional swing bearing is generally formed from bearing steel through cutting work and the like. Use of bearing steel imposes a limitation on a reduction in weight and manufacturing cost. In recent years, the demand for swing bearings has increased rapidly in the fields of industrial robots, robots for care, etc. Swing bearings to be incorporated into robot arms have been required to provide light weight and light movement. However, the manufacture of conventional swing bearings involves cutting work, etc., on bearing steel, and such cutting work imposes a limitation on a reduction in manufacturing cost and weight. In this regard, the applicant of the present invention has conceived that a swing bearing having light weight and providing smooth swing motion may possibly be manufactured at low cost by use of a thin plate material and through low-cost manufacturing work such as press working on the plate material.

SUMMARY OF THE INVENTION

The present invention has been conceived to solve the above problem, and an object of the invention is to provide an improved swing bearing which allows a reduction in weight, thickness, and manufacturing cost thereof. In the improved swing bearing, a pair of split rings of an outer ring and a pair of split rings of an inner ring are formed from a predetermined thin plate material. Specifically, each of the split rings is formed by, for example, press working on a steel plate, cutting work on a metal plate having a predetermined thickness, forging work, or forming work on a synthetic resin material. The two split rings of the outer ring are fixed together to form the outer ring, and the two split rings of the inner ring are fixed together to form the inner ring.

Means to Solve the Problems

The present invention provides a swing bearing comprising an annular outer ring, an annular inner ring, and a plurality of rolling elements. The outer ring has a first raceway groove formed on an inner circumferential surface thereof. The inner ring has a second raceway groove formed on an outer circumferential surface thereof in such a manner as to face the first raceway groove of the outer ring, and is disposed concentrically with the outer ring and rotatably in relation to the outer ring. The rolling elements are disposed in a load-carrying race formed between the first raceway groove of the outer ring and the second raceway groove of the inner ring. The outer ring is composed of a pair of split rings which are obtained by splitting the outer ring at an axially midpoint of the first raceway groove and are fixed together. The inner ring is composed of a pair of split rings which are obtained by splitting the inner ring at an axially midpoint of the second raceway groove and are fixed together. Each of the split rings of the outer ring and the split rings of the inner ring is formed of a plate member having a predetermined thickness.

Each of the split rings of the outer ring comprises a first flat disk extending radially, a first track forming portion bent and extending from an inner peripheral end of the first flat disk in an inclination direction, and partially defining the first raceway groove, and a first flange portion bent and extending from an inner peripheral end of the first track forming portion in the axial direction. Each of the split rings of the inner ring comprises a second flat disk extending radially, a second track forming portion extending from an outer peripheral end of the second flat disk in such a manner as to face the first track forming portion, and partially defining the second raceway groove, and a second flange portion extending from an outer peripheral end of the second track forming portion in such a manner as to face the first flange portion.

The first flat disk of one split ring of the outer ring has a first labyrinth portion formed at an outer periphery of the first flat disk, extending in the axial direction, and entirely covering a circumferentially extending end surface of the first flat disk of the other split ring of the outer ring. The first flange portions of the split rings of the outer ring have respective second labyrinth portions extending radially inward and entirely covering circumferentially extending end surfaces of the second flange portions of the split rings of the inner ring.

The present swing bearing is configured as follows: the first flat disks of the split rings of the outer ring have mounting holes for fixing the split rings of the outer ring together or mounting a mating member to the outer ring, positioning-cum-fixing projections, and positioning-cum-fixing recesses to be engaged with the corresponding positioning-cum-fixing projections, the mounting holes, the positioning-cum-fixing projections, and the positioning-cum-fixing recesses being formed at predetermined circumferential intervals; and the second flat disks of the split rings of the inner ring have mounting holes for fixing the split rings of the inner ring together or mounting a mating member to the inner ring, positioning-cum-fixing projections, and positioning-cum-fixing recesses to be engaged with the corresponding positioning-cum-fixing projections, the mounting holes, the positioning-cum-fixing projections, and the positioning-cum-fixing recesses being formed at predetermined circumferential intervals. Further, an even number of the mounting holes, an even number of the projections, and an even number of the recesses are formed in or on each of the first flat disks in the same circumferential sequence at equal intervals, and an even number of the mounting holes, an even number of the projections, and an even number of the recesses are formed in or on each of the second flat disks in the same circumferential sequence at equal intervals.

Also, the outer ring is configured such that the first flat disks of the two split rings of the outer ring are fixed together in close contact with each other with the first flange portions extending in axially opposite directions and with the projections formed on one split ring of the outer ring being engaged with the corresponding recesses formed in the other split ring of the outer ring. The inner ring is configured such that the second flat disks of the two split rings of the inner ring are fixed together in close contact with each other with the second flange portions extending in axially opposite directions and with the projections formed on one split ring of the inner ring being engaged with the corresponding recesses formed in the other split ring of the inner ring.

The present swing bearing is configured as follows: the rolling elements are rollers, and each of the first track forming portions and the second track forming portions has a conical surface, so that each of the first raceway groove and the second raceway groove has a raceway surface having an approximately V-shaped cross section. Further, the swing bearing is a cross roller bearing configured such that the rollers circumferentially adjacent to each other are disposed one after another in the load-carrying race with their axes of rotation intersecting with each other and such that separators are disposed between the rollers, or the rollers are retained by a retainer.

Alternatively, the rolling elements are balls, and each of the first track forming portions and the second track forming portions has an arcuate surface, so that each of the first raceway groove and the second raceway groove has a raceway surface having an approximately semicircular cross section.

Also, the split rings of the outer ring and the split rings of the inner ring are formed by press working on a steel plate having a predetermined thickness, cutting work on a metal plate having a predetermined thickness, or forming work on a synthetic resin material.

Effect of the Invention

According to the present swing bearing, as mentioned above, the outer ring is formed by fixing a pair of the split rings thereof together; the inner ring is formed by fixing a pair of the split rings thereof together; each of the split rings of the outer ring and the split rings of the inner ring is formed from a plate material having a predetermined thickness; and working on the plate material is press working on a steel plate, cutting work on a plate material having a predetermined thickness, forging work, or forming work on a synthetic resin material. Accordingly, a predetermined thickness, particularly a small thickness, can be imparted to the split rings of the outer ring and the split rings of the inner ring. In the case where the split rings of the outer ring and the split rings of the inner ring are manufactured by press working, by the actions of dies, the raceway surface formed on each split ring has a rounded convex shape (similar to a shape obtained though chamfering) at opposite end portions thereof. As a result, in the case of use of rollers as rolling elements, the contact area between the rollers and the raceway surfaces of the raceway grooves can be reduced, whereby a rotating torque can be reduced. Furthermore, gaps are formed between the rounded portions of the raceway surfaces and the rollers, and the gaps serve as lubricant pits for retaining lubricant, whereby durability can be improved. Also, the first flat disks of the split rings of the outer ring have the mounting holes for fixing the split rings of the outer ring together or mounting a mating member to the outer ring, the positioning-cum-fixing projections, and the positioning-cum-fixing recesses, and the second flat disks of the split rings of the inner ring have the mounting holes for fixing the split rings of the inner ring together or mounting a mating member to the inner ring, the positioning-cum-fixing projections, and the positioning-cum-fixing recesses. Further, an even number of the mounting holes, an even number of the projections, and an even number of the recesses are formed on each of the first flat disks in the same circumferential sequence at equal intervals, and an even number of the mounting holes, an even number of the projections, and an even number of the recesses are formed on each of the second flat disks in the same circumferential sequence at equal intervals. Accordingly, by manufacturing only one type of split ring of the outer ring and only one type of split ring of the inner ring, the outer ring is formed by putting together the first flat disks of the mutually inverted split rings of the outer ring with the projections fitted into the corresponding recesses. Similarly, the inner ring is formed by putting together the second flat disks of the mutually inverted split rings of the inner ring with the projections fitted into the corresponding recesses. Therefore, the number of components can be reduced; the manufacturing cost can be reduced; and manufacturing is facilitated.

BRIEF DESCRIPTION OF THE DRAWINGS

FIGS. 3(A) to 3(D) show the swing bearing of FIG. 1, wherein FIG. 3(A) is a plan view of the swing bearing, FIG. 3(B) is a sectional view taken along line a-a of FIG. 3(A), FIG. 3(C) is a sectional view taken along line b-b of FIG. 3(A), and FIG. 3(D) is a sectional view taken along line c-c of FIG. 3(A);

FIGS. 4(A) to 4(D) show a split ring of the inner ring of the swing bearing of FIG. 1, wherein FIG. 4(A) is a plan view of the split ring, FIG. 4(B) is a sectional view taken along line a-a of FIG. 4(A), FIG. 4(C) is a sectional view taken along line b-b of FIG. 4(A), and FIG. 4(D) is a sectional view taken along line c-c of FIG. 4(A);

FIGS. 5(A) to 5(D) show a split ring of the outer ring of the swing bearing of FIG. 1, wherein FIG. 5(A) is a plan view of the split ring, FIG. 5(B) is a sectional view taken along line a-a of FIG. 5(A), FIG. 5(C) is a sectional view taken along line b-b of FIG. 5(A), and FIG. 5(D) is a sectional view taken along line c-c of FIG. 5(A);

FIGS. 13(A) to 13(D) show the ball-type swing bearing of FIG. 11, wherein FIG. 13(A) is a plan view of the ball-type swing bearing, FIG. 13(B) is a sectional view taken along line a-a of FIG. 13(A), FIG. 13(C) is a sectional view taken along line b-b of FIG. 13(A), and FIG. 13(D) is a sectional view taken along line c-c of FIG. 13(A);

FIGS. 14(A) and 14(B) show a split ring of a ball-type outer ring of the swing bearing according to the present invention, wherein FIG. 14(A) is a sectional view of the split ring, and FIG. 14(B) is an enlarged sectional view showing a portion of the split ring of FIG. 14(A);

FIGS. 15(A) and 15(B) show a split ring of a ball-type inner ring of the swing bearing according to the present invention, wherein FIG. 15(A) is a sectional view of the split ring, and FIG. 15(B) is an enlarged sectional view showing a portion of the split ring of FIG. 15(A);

DETAILED DESCRIPTION OF THE EMBODIMENTS

Figure 1:
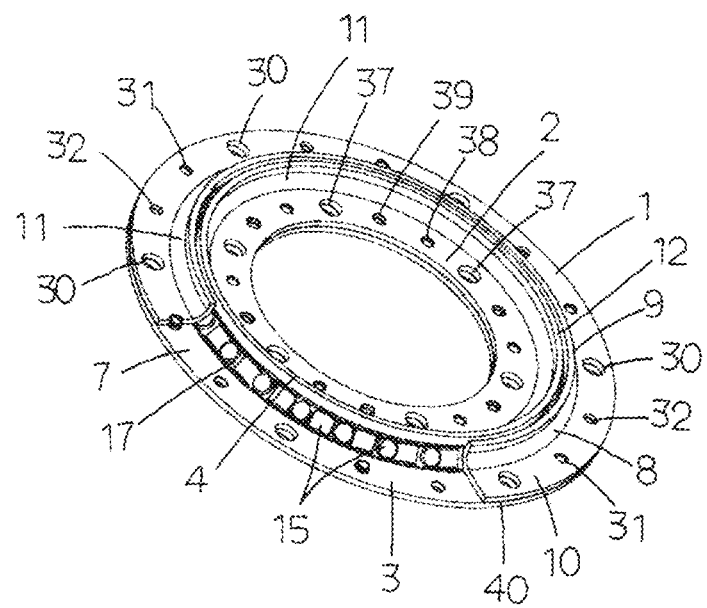
FIG. 1 is a perspective view showing a full complement cross roller bearing which is a first embodiment of the swing bearing according to the present invention with a split ring of an outer ring depicted partially cut away.
Figure 2:
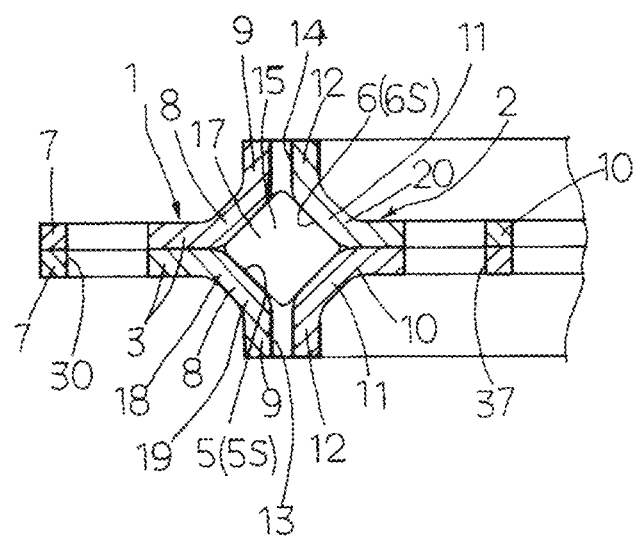
FIG. 2 is a sectional view of the swing bearing of FIG. 1 showing a pair of split rings of the outer ring, a portion of a pair of split rings of an inner ring, and a roller disposed in a load-carrying race defined by the outer ring and the inner ring.
Figure 3:
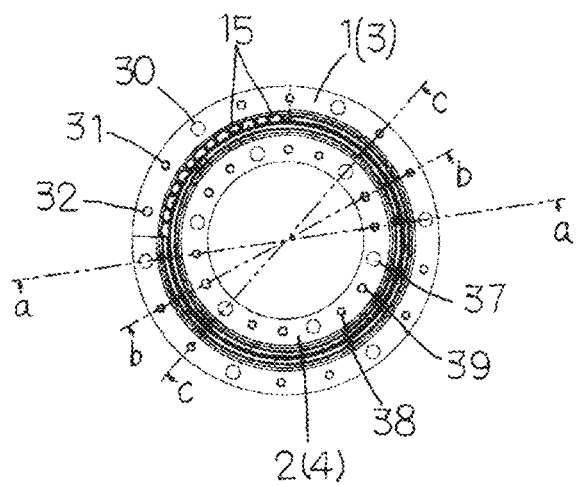
Figure 3:
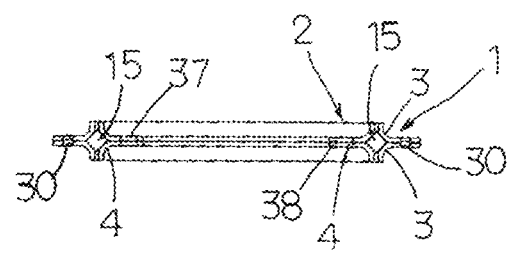
Figure 3:
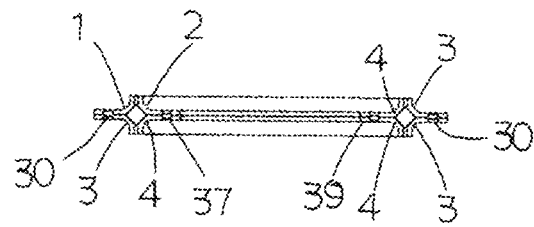
Figure 3:
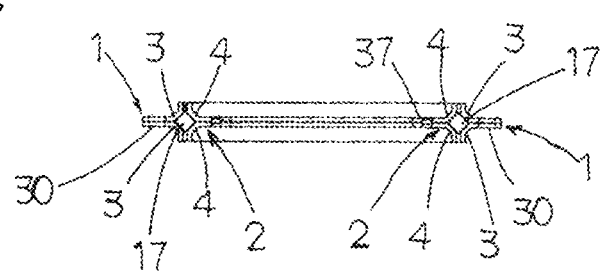
Figure 4:
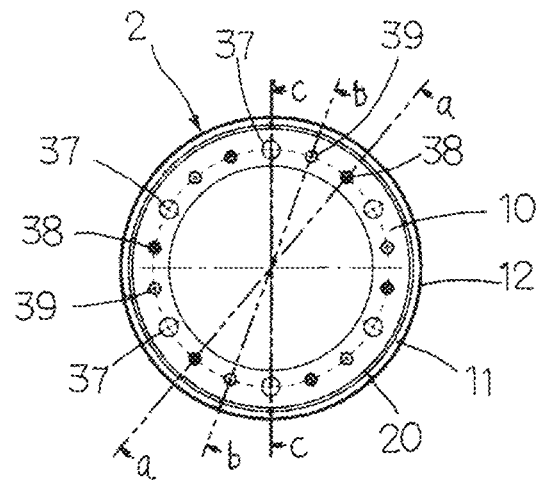
Figure 4:
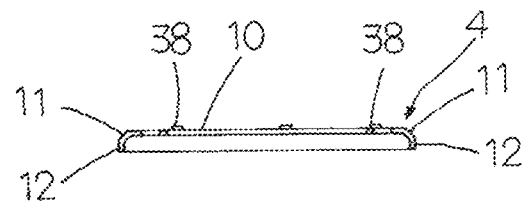
Figure 4:
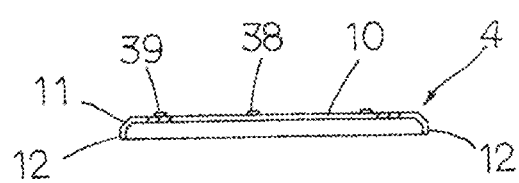
Figure 4:
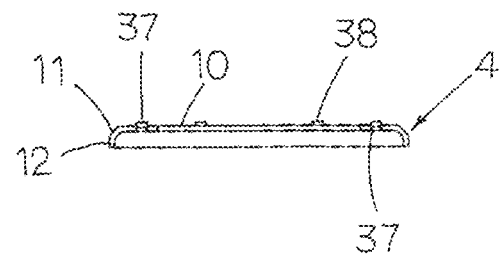
Figure 5:
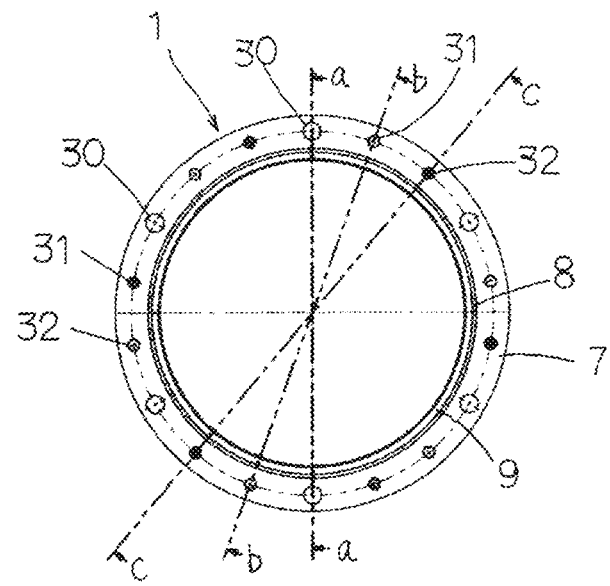
Figure 5:
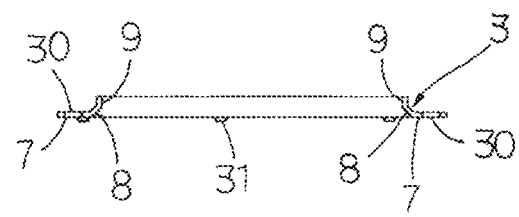
Figure 5:
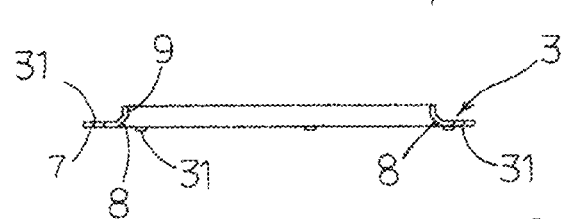
Figure 5:
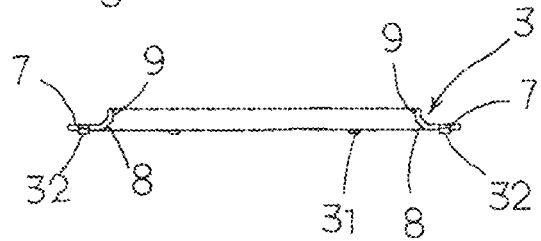

Embodiments of the swing bearing according to the present invention will next be described with reference to the drawings. The swing bearing according to the present invention can have a light, compact, thin structure and can be incorporated into sliding sections, oscillating sections, swinging sections, etc., of various kinds of apparatus, such as industrial robots and other types of robots, optical instruments, medical instruments, machine tools, various kinds of assembling apparatus, semiconductor fabrication apparatus, and measuring apparatus. Particularly, the swing bearing of the present invention allows each of an outer ring 1 and an inner ring 2 to have a unitary, compact, thin-walled structure, so that the swing bearing is lightweight, easy to handle, and smooth in motion. First, with reference to FIGS. 1 to 6, a first embodiment of the swing bearing according to the present invention will be described. The swing bearing according to the present invention is a cross roller bearing. The cross roller bearing includes a hollow or annular outer ring 1 having a raceway groove 5 (first raceway groove) formed on an inner circumferential surface 13, a hollow or annular inner ring 2 having a raceway groove 6 (second raceway groove) formed on an outer circumferential surface 14 in such a manner as to face the raceway groove 5 of the outer ring 1, and disposed concentrically with the outer ring 1 and rotatably in relation to the outer ring 1, and a plurality of rolling elements; i.e., rollers 15, disposed in a load-carrying race 16 formed between the raceway groove 5 of the outer ring 1 and the raceway groove 6 of the inner ring 2.

The present swing bearing is characterized in that each of the outer ring 1 and the inner ring 2 is split in two. The outer ring 1 is composed of a pair of split rings 3 which are obtained by splitting the outer ring 1 at the axially midpoint of a raceway surface 5S defining the raceway groove 5 (hereinafter referred to as "the raceway surface 5S of the raceway groove 5") and which are fixed together. Similarly, the inner ring 2 is composed of a pair of split rings 4 which are obtained by splitting the inner ring 2 at the axially midpoint of a raceway surface 6S defining the raceway groove 6 (hereinafter referred to as "the raceway surface 6S of the raceway groove 6") and which are fixed together.

Further, the split rings 3 of the outer ring 1 and the split rings 4 of the inner ring 2 are characterized by each being formed from a plate material having a predetermined thickness, thereby implementing a reduction in thickness, weight, and manufacturing cost. Specifically, according to the present swing bearing, each of the split rings 3 of the outer ring 1 and the split rings 4 of the inner ring 2 is formed by press working on a steel plate having a predetermined thickness, cutting work on a metal plate having a predetermined thickness, or forming work on ceramic, such as silicon nitride or silicon carbide, or a synthetic resin material by use of dies or the like. The predetermined thickness of a plate material used to form the split rings 3 of the outer ring 1 and the split rings 4 of the inner ring 2 can be determined, for example, so as to impart the same thickness to a flat disk 7 or 10, a track forming portion 8 or 11, and a flange portion 9 or 12.

According to the present swing bearing, the split rings 3 of the outer ring 1 and the split rings 4 of the inner ring 2 can be manufactured easily to desired shape by press working. A metal material used to form the split rings 3 of the outer ring 1 and the split rings 4 of the inner ring 2 is preferably easy to form and suitable for heat treatment. For example, SCM415 can be used. After a process of forming the split rings 3 of the outer ring 1 and the split rings 4 of the inner ring 2 by press working, there is no need to perform removal machining for forming the raceway grooves 5 and 6. Each raceway groove 5 or 6 formed by press working has rounded surfaces at opposite ends thereof (on the sides toward flat surface portions at the opposite ends). Since the rounded surfaces are recessed from the raceway surface 5S or 6S (as in the case of chamfering), the contact area between rolling elements and the raceway surface 5S or 6S is reduced. In the case where the rollers 15 serve as rolling elements, the area of contact between the end surface of each roller and the raceway surface 5S or 6S is reduced. Each of the split rings 3 of the outer ring 1 includes the flat disk 7 (first flat disk) extending radially, a track forming portion 8 (first track forming portion) bent and extending from an inner peripheral end 18 of the flat disk 7 in an inclination direction and partially forming the raceway surface 5S of the raceway groove 5, and the flange portion 9 (first flange portion) bent and extending from an inner peripheral end 19 of the track forming portion 8 in the axial direction. Each of the split rings 4 of the inner ring 2 includes the flat disk 10 (second flat disk) extending radially, a track forming portion 11 (second track forming portion) extending from an outer peripheral end 20 of the flat disk 10 in such a manner as to face the track forming portion 8, and partially forming the raceway surface 6S of the raceway groove 6, and the flange portion 12 (second flange portion) extending from an outer peripheral end 21 of the track forming portion 11 in such a manner as to face the flange portion 9. When the split rings 3 of the outer ring 1 and the split rings 4 of the inner ring 2 are assembled together to thereby form the load-carrying race 17 having a V-shaped cross section, the rounded portions of the raceway surface 5S corresponding to a bottom portion of the letter V form a gap which rolling elements do not come into contact with, so that the gap can hold lubricant. Also, foreign matter which has entered the load-carrying race 17 is collected in the gap at the bottom portion of the letter V, thereby reducing damage to the raceway surfaces 5S and 6S and thus improving durability. The present swing bearing is designed such that the raceway groove 5 defined by the split rings 3 of the outer ring 1 and the raceway groove 6 defined by the split rings 4 of the inner ring 2 undergo heat treatment. In the case of a steel material of SCM415 or the like, examples of heat treatment include carburized quenching and tempering, carbonitriding, etc. Such heat treatment hardens surface only. The conditions of the heat treatment are determined according to material conditions and required service conditions. After the heat treatment, barrel polishing can be performed for finishing appearance.

The flat disks 7 of the split rings 3 of the outer ring 1 have a plurality of mounting holes 30 formed therein at predetermined circumferential intervals and a plurality of engagement projections 31 and engagement recesses 32 formed thereon or therein at circumferentially predetermined intervals. Similarly, the flat disks 10 of the split rings 4 of the inner ring 2 have a plurality of mounting holes 37 formed therein at predetermined circumferential intervals and a plurality of engagement projections 38 and engagement recesses 39 formed thereon or therein at circumferentially predetermined intervals. Further, in the swing bearing, an even number of the mounting holes 30, an even number of the projections 31, and an even number of the recesses 32 are formed in or on the flat disks (flat surface portions) 7 in the same circumferential sequence at equal intervals to be point symmetry about the center of the split rings 3 of the outer ring 1. Similarly, an even number of the mounting holes 37, an even number of the projections 38, and an even number of the recesses 39 are formed in or on the flat disks 10 (flat surface portions) in the same circumferential sequence at equal intervals to be point symmetry about the center of the split rings 4 of the inner ring 2. Particularly, the engagement projections 31 and the engagement recesses 32 are formed in such a manner as to be engaged together when the split rings 3 of the outer ring 1 are brought in close contact with each other in a mutually facing manner while the split rings 4 of the inner ring 2 are brought in close contact with each other in a mutually facing manner. Accordingly, the two split rings 3 of the outer ring 1 can be mutually positioned and fixedly engaged together while the two split rings 4 of the inner ring 2 can be mutually positioned and fixedly engaged together. According to the present swing bearing, the projections 31 and the recesses 32 for positioning and fixing together the split rings 3 of the outer ring 1 and the mounting holes 30 used for mounting to a mating member 33 can be formed simultaneously in or on the flat disk 7 by press working; similarly, the projections 38 and the recesses 39 for positioning and fixing together the split rings 4 of the inner ring 2 and the mounting holes 37 used for mounting to a mating member 34 can be formed simultaneously in or on the flat disk 10 by press working. The projections 31 and 38 and the recesses 32 and 39 are formed alternately on or in the split rings 3 of the outer ring 1 and the split rings 4 of the inner ring 2, respectively, at circumferentially equal intervals in the same number of pieces. The split rings 3 of the outer ring 1 are fitted together in such a manner as to engage the corresponding projections 31 and recesses 32 together, thereby fixedly assembling the outer ring 1; similarly, the split rings 4 of the inner ring 2 are fitted together in such a manner as to engage the corresponding projections 38 and recesses 39 together, thereby fixedly assembling the inner ring 2. According to the present swing bearing, as mentioned above, the split rings 3 of the outer ring 1 are fixed together by engaging together the corresponding projections 31 and recesses 32, and the split rings 4 of the inner ring 2 are fixed together by engaging together the corresponding projections 38 and recesses 39. Needless to say, fixing can be performed by using other members such as bolts, bonding, welding, or the like.

Figure 6:
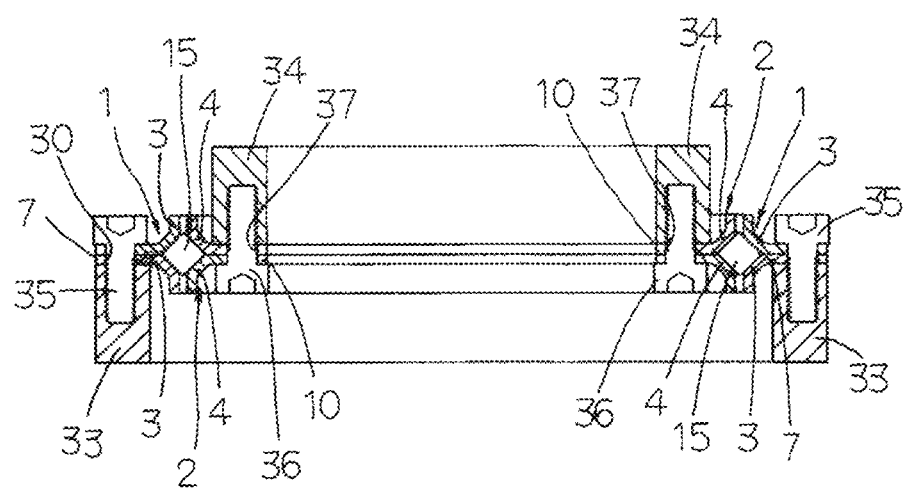
FIG. 6 is a sectional view exemplifying the state in which the cross roller bearing (swing bearing) of FIG. 1 is mounted to mating members.

The outer ring 1 is configured as follows: the two split rings 3 of the outer ring 1 are fixed together while the flat disks 7 are in close contact with each other in an aligned manner with the two flange portions 9 extending in axially opposite directions and with the projections 31 formed on one split ring 3 of the outer ring 1 being engaged with the corresponding recesses 32 formed in the other split ring 3 of the outer ring 1. In the outer ring 1 in this state, the track forming portions 8 of the split rings 3 of the outer ring 1 face each other and define the raceway surface 5S having a V-shaped cross section and opening toward an inner circumference side. Similarly, the inner ring 2 is configured as follows: the two split rings 4 of the inner ring 2 are fixed together while the flat disks 10 are in close contact with each other in an aligned manner with the two flange portions 12 extending in axially opposite directions and with the projections 31 formed on one split ring 4 of the inner ring 2 being engaged with the corresponding recesses 32 formed in the other split ring 4 of the inner ring 2. In the inner ring 2 in this state, the track forming portions 11 of the split rings 4 of the inner ring 2 face each other and define the raceway surface 6S having a V-shaped cross section and opening toward an outer circumference side. As shown in FIG. 6, the present swing bearing can be mounted to the mating members 33 and 34. According to the present swing bearing, for example, the outer ring 1 composed of the two split rings 3 is fixed to the mating member 33 by inserting screws 35 through the respective mounting holes 30 of the flat disks 7 and screwing the screws 35 into the mating member 33, and the inner ring 4 composed of the two split rings 4 is fixed to the mating member 34 by inserting screws 36 through the respective mounting holes 37 of the flat disks 10 and screwing the screws 36 into the mating member 34.

In assembly of the present swing bearing, for example, the inner ring 2 is disposed on a jig, whereas one split ring 3 of the outer ring 1 is disposed on the jig. Since the other split ring 3 of the outer ring 1 is not mounted, the load-carrying race 17 is partially open. Therefore, by disposing rolling elements in the open load-carrying race 17, aligning the other split ring 3 of the outer ring 1 with the one split ring 3, and finally fixing the split rings 3 together, the swing bearing can be assembled with the rolling elements incorporated therein.

Figure 7:
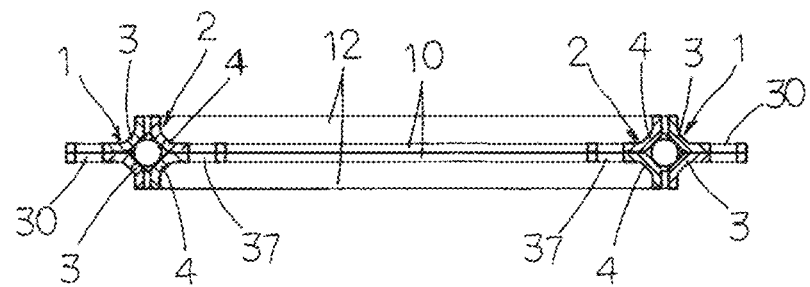
FIG. 7 is a sectional view showing a cross roller bearing which is a second embodiment of the swing bearing according to the present invention and in which separators are individually disposed between rolling elements.
Figure 8:
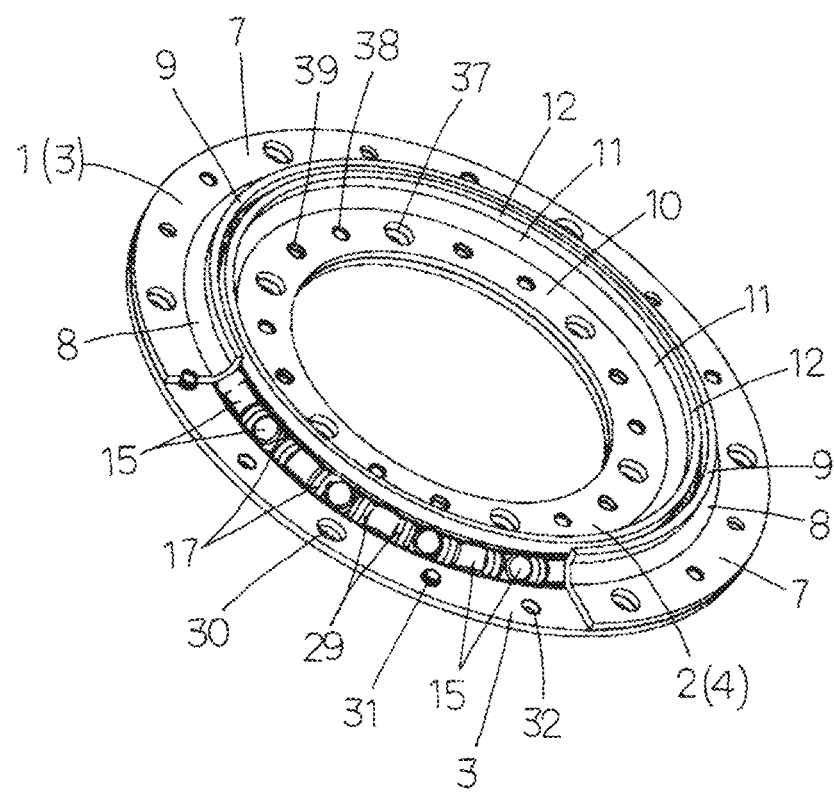
FIG. 8 is a perspective view showing the cross roller bearing of FIG. 7 with a split ring of the outer ring depicted partially cut away.

With reference to FIGS. 7 and 8, a second embodiment of the swing bearing according to the present invention will next be described. The present swing bearing is of a type in which the rollers 15 are incorporated therein as rolling elements. Use of ceramic rollers as rolling elements can further reduce weight. In contrast to a full complement cross roller bearing of the first embodiment in which only the rollers 15 reside in the load-carrying race 17, the second embodiment of the swing bearing is a cross roller bearing configured such that separators 29 are disposed individually between the rollers 15 for preventing contact between the rollers 15 and allowing smooth rolling of the rollers 15. In the second embodiment, the track forming portions 8 of the outer ring 1 each have a conical surface, and the track forming portions 11 of the inner ring 2 each have a conical surface. As a results, the raceway surface 5S of the raceway groove 5 of the outer ring 1 defines the load-carrying race 17 having an approximately V-shaped cross section, and the raceway surface 6S of the raceway groove 6 of the inner ring 2 defines the load-carrying race 17 having an approximately V-shaped cross section. Further, in the second embodiment, in order to bear loads from a plurality of directions, the swing bearing is configured as a cross roller bearing in which the axial directions of the rollers 15 are orthogonal to each another. Specifically, the circumferentially adjacent rollers 15 are sequentially disposed in the load-carrying races 17 such that the axes of rotation of the rollers 15 are orthogonal to each other. Therefore, the present swing bearing is a cross roller bearing in which the separators 29 are individually disposed between the rollers 15.

Figure 9:
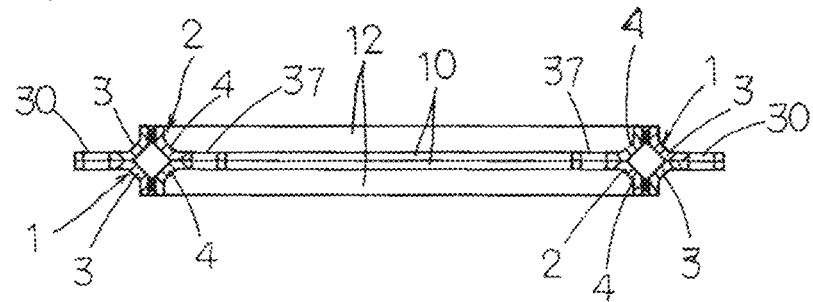
FIG. 9 is a sectional view showing a cross roller bearing which is a third embodiment of the swing bearing according to the present invention and in which rollers serving as rolling elements are retained by a retainer.
Figure 10:
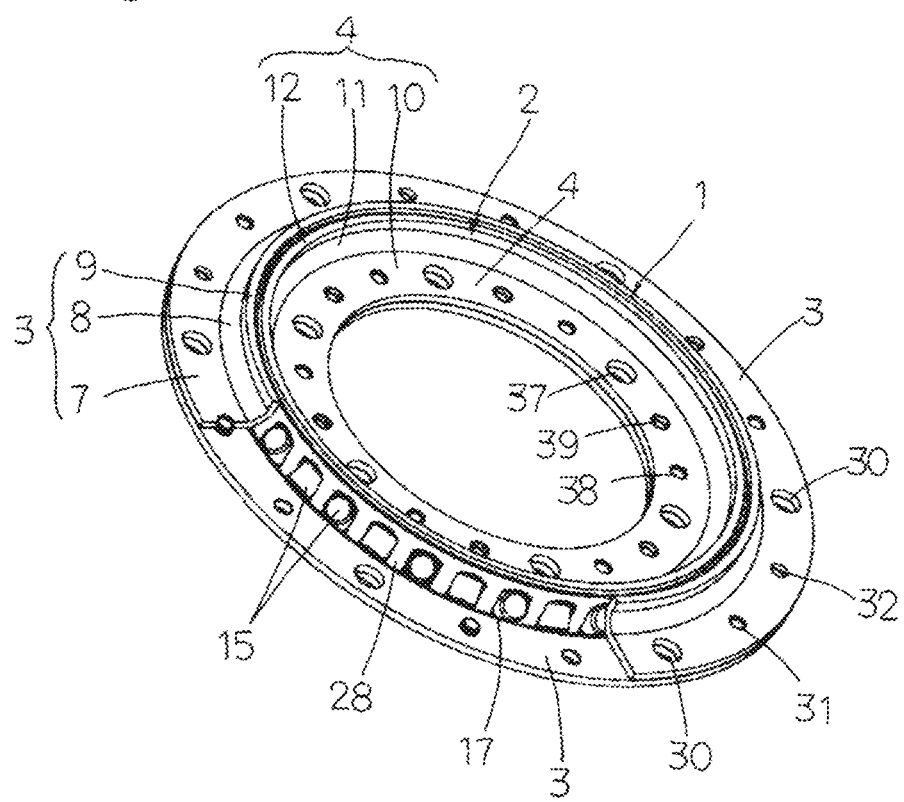
FIG. 10 is a perspective view showing the cross roller bearing of FIG. 9 with a split ring of the outer ring depicted partially cut away.
Figure 11:
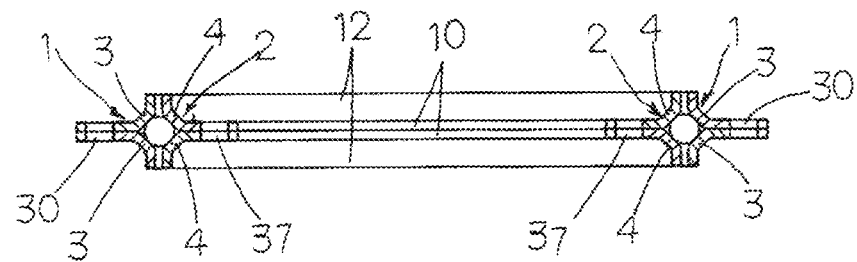
FIG. 11 is a sectional view showing a ball-type swing bearing according to a fourth embodiment of the swing bearing of the present invention in which balls are used as rolling elements.
Figure 12:
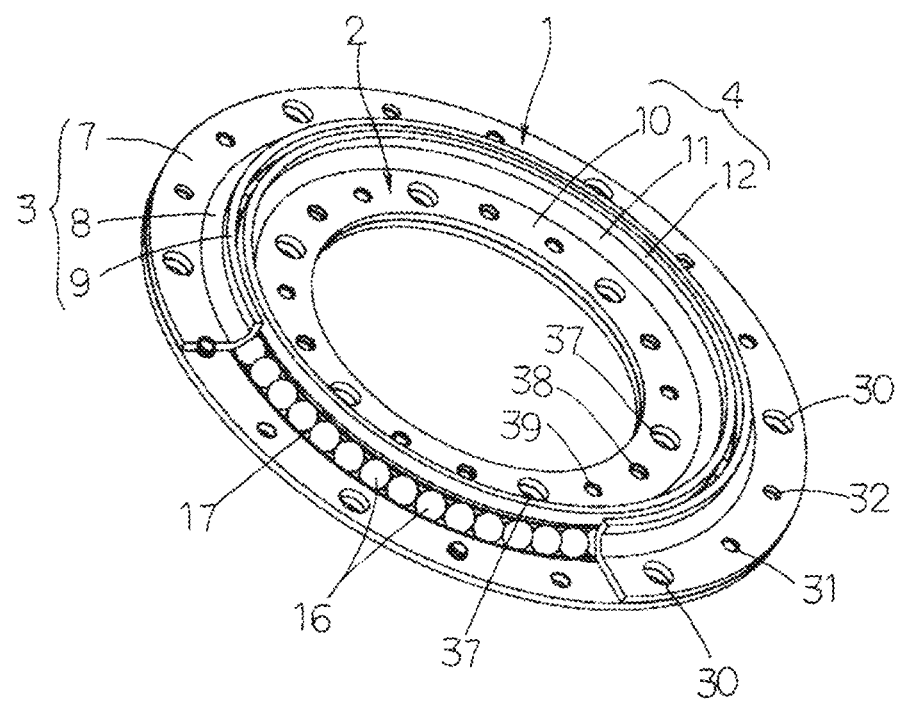
FIG. 12 is a perspective view showing the swing bearing of FIG. 11 with a split ring of the outer ring depicted partially cut away.
Figure 13:
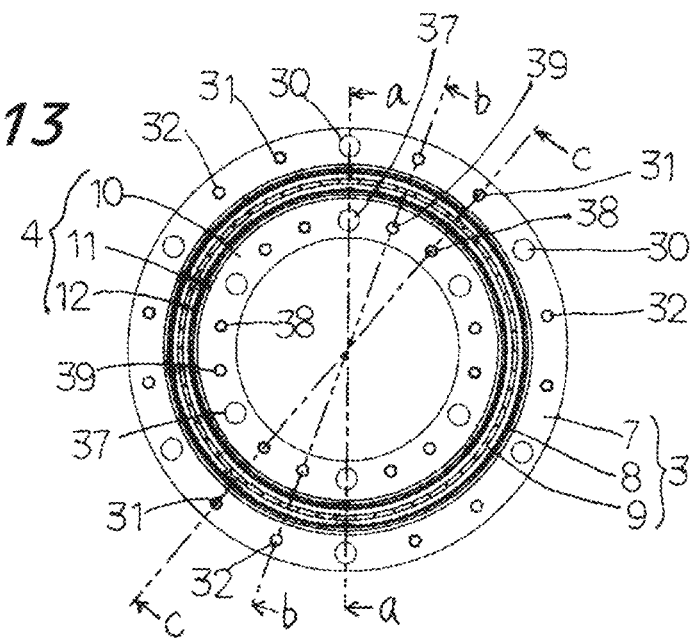
Figure 13:
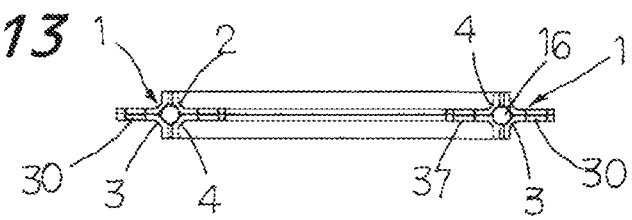
Figure 13:
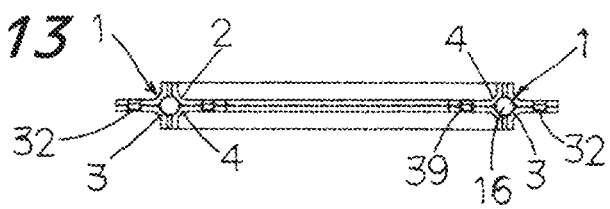
Figure 13:
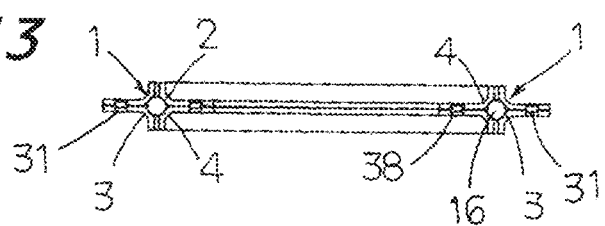

With reference to FIGS. 9 and 10, a third embodiment of the swing bearing according to the present invention will next be described. Similarly to the second embodiment, the present swing bearing is of a type in which the rollers 15 are incorporated therein as rolling elements. In the third embodiment, the swing bearing is a cross roller bearing in which the rollers 15 are retained by a retainer 28.

With reference to FIGS. 11 to 15, a fourth embodiment of the swing bearing according to the present invention will next be described. The present swing bearing is of a type in which balls 16 are incorporated therein as rolling elements. According to the present swing bearing, each track forming portion 8 of the outer ring 1 has an arcuate surface 5R, and each track forming portion 10 of the inner ring 2 has an arcuate surface 6R. As a result, the raceway groove 5 of the outer ring 1 has a raceway surface having an approximately semicircular cross section, and the raceway groove 6 of the inner ring 2 has a raceway surface having an approximately semicircular cross section. In contrast to the first, second, and third embodiments in which the rollers 15 are used as rolling elements, the fourth embodiment uses the balls 16 as rolling elements. By using ceramic balls as rolling elements, weight can be further reduced.

Figure 16:
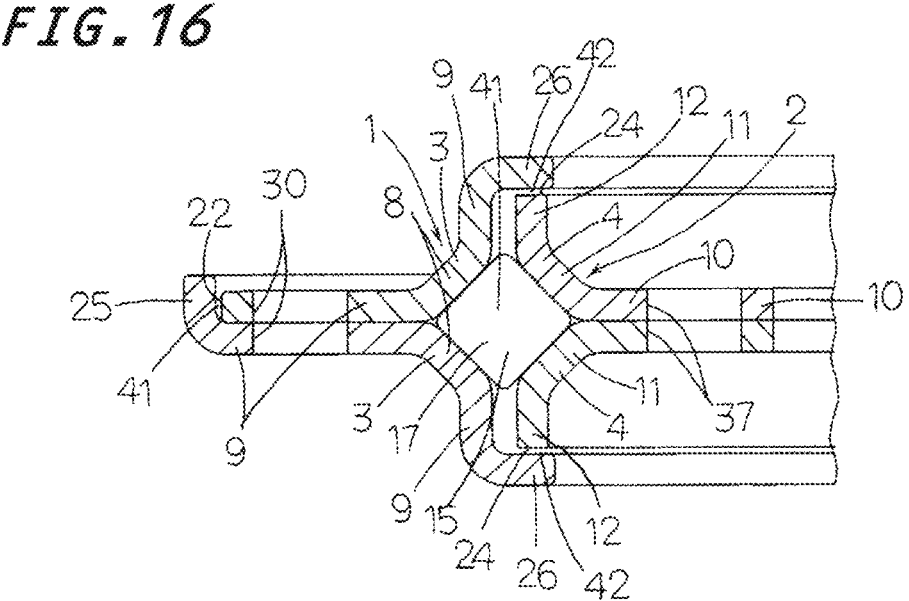
FIG. 16 is a fragmentary enlarged sectional view showing a fifth embodiment of the swing bearing according to the present invention in which the split rings of the outer ring have respective labyrinth portions.

With reference to FIG. 16, a fifth embodiment of the swing bearing according to the present invention will next be described. In the fifth embodiment, the split rings 3 of the outer ring 1 have labyrinth portions 25 and 26 at inner and outer circumferential sides thereof. In the present swing bearing, the flat disk 7 of one split ring 3 of the outer ring 1 has the labyrinth portion 25 provided at an outer periphery of the flat disk 7, extending in the axial direction, and entirely covering a circumferentially extending end surface 22 of the flat disk 7 of the other split ring 7 of the outer ring 1. Also, in the present swing bearing, the flange portions 9 of the split rings 3 of the outer ring 1 have the respective labyrinth portions 26 extending radially inward and entirely covering circumferentially extending end surfaces 24 of the flange portions 12 of the split rings 4 of the inner ring 2. In the present swing bearing, in order to impart a labyrinth structure to a clearance 41 at the outer peripheries of the split rings 3 of the outer ring 1 and a labyrinth structure to a clearance 42 between the outer ring 1 and the inner ring 2, the flat disk 7 of one split ring 3 of the outer ring 1 and the flange portions 9 of the both split rings 3 of the outer ring 1 are bent by 90?. Such bending work can be incorporated into press working. In the present embodiment, the employment of the labyrinth structure can prevent leakage of lubricant and entry of foreign matter. In the fifth embodiment, the flat disk 7 (flat surface portion) of one split ring 3 of the outer ring 1 is extended in the axial direction such that the labyrinth portion 25 covers the flat disk 7 of the other split ring 3 of the outer ring 1; also, the flange portions 9 of the split rings 3 of the outer ring 1 are radially extended such that the labyrinth portions 26 cover the respective flange portions 12 of the inner ring 2. Such labyrinth structures can prevent entry of foreign matter and leakage of lubricant through the clearances 41 and 42.

Figure 17:
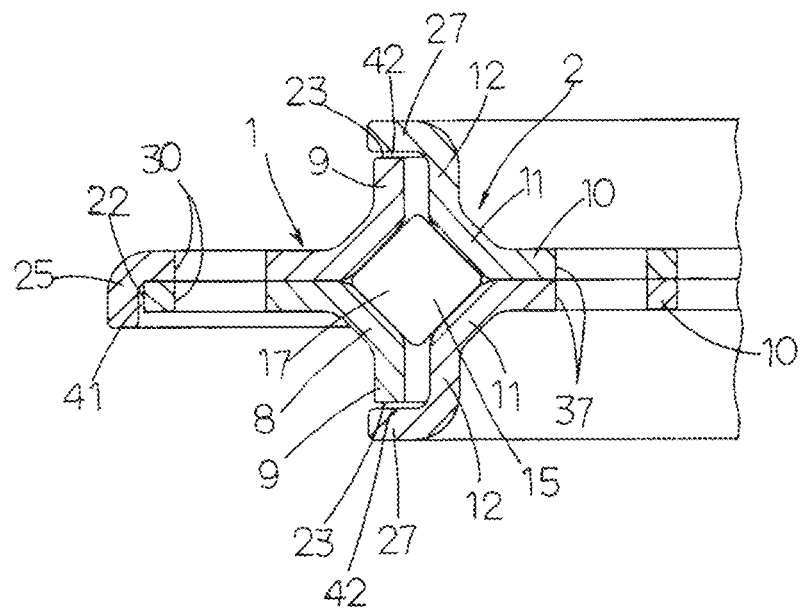
FIG. 17 is a fragmentary enlarged sectional view showing a sixth embodiment of the swing bearing according to the present invention in which one split ring of the outer ring has a labyrinth portion, and the split rings of the inner ring have respective labyrinth portions.

With reference to FIG. 17, a sixth embodiment of the swing bearing according to the present invention will next be described. In the sixth embodiment, similarly to the fifth embodiment, one split ring 3 of the outer ring 1 has the labyrinth portion 25 at the outer circumferential side thereof. Further, the split rings 4 of the inner ring 2 have respective labyrinth portions 27 at an outer circumference side thereof. The flange portions 12 of the split rings 4 of the inner ring 2 have the respective labyrinth portions 27 extending radially outward and entirely covering circumferentially extending end surfaces 23 of the flange portions 9 of the split rings 3 of the outer ring 1.

What is claimed is:

1. A swing bearing comprising:
   an annular outer ring having a first raceway groove formed on an inner circumferential surface thereof; an annular inner ring having a second raceway groove formed on an outer circumferential surface thereof in such a manner as to face the first raceway groove of the outer ring, and disposed concentrically with the outer ring and rotatably in relation to the outer ring; and a plurality of rolling elements disposed in a load-carrying race formed between the first raceway groove of the outer ring and the second raceway groove of the inner ring;
   wherein the outer ring is composed of a pair of split rings which are obtained by splitting the outer ring at an axially midpoint of the first raceway groove and are fixed together;
   the inner ring is composed of a pair of split rings which are obtained by splitting the inner ring at an axially midpoint of the second raceway groove and are fixed together;
   each of the split rings of the outer ring and the split rings of the inner ring comprises a plate member having a predetermined thickness, and
   wherein each of the split rings of the outer ring comprises a first flat disk extending radially, a first track forming portion bent and extending from an inner peripheral end of the first flat disk in an inclination direction, and partially defining the first raceway groove, and a first flange portion bent and extending from an inner peripheral end of the first track forming portion in the axial direction, and
   wherein each of the split rings of the inner ring comprises a second flat disk extending radially, a second track forming portion extending from an outer peripheral end of the second flat disk in such a manner as to face the first track forming portion, and partially defining the second raceway groove, and a second flange portion extending from an outer peripheral end of the second track forming portion in such a manner as to face the first flange portion.

2. A swing bearing according to claim 1, wherein the first flat disk of one split ring of the outer ring has a labyrinth portion which is formed at an outer periphery of the first flat disk, extending in the axial direction, and entirely covering a circumferentially extending end surface of the first flat disk of the other split ring of the outer ring, and
   the first flange portions of the split rings of the outer ring have respective labyrinth portions extending radially inward and entirely covering circumferentially extending end surfaces of the second flange portions of the split rings of the inner ring.

3. A swing bearing according to claim 1, wherein the first flat disk of one split ring of the outer ring has a labyrinth portion formed at an outer periphery of the first flat disk, extending in the axial direction, and entirely covering a circumferentially extending end surface of the first flat disk of the other split ring of the outer ring, and
   the second flange portions of the split rings of the inner ring have respective labyrinth portions extending radially outward and entirely covering circumferentially extending end surfaces of the first flange portions of the split rings of the outer ring.

4. A swing bearing according to claim 1, wherein
   the first flat disks of the split rings of the outer ring have mounting holes for fixing the split rings of the outer ring together or mounting a mating member to the outer ring, positioning and fixing projections, and positioning and fixing recesses to be engaged with corresponding ones of the positioning and fixing projections, the mounting holes, the positioning and fixing projections, and the positioning and fixing recesses being formed at predetermined circumferential intervals, and
   the second flat disks of the split rings of the inner ring have mounting holes for fixing the split rings of the inner ring together or mounting a mating member to the inner ring, positioning and fixing projections, and positioning and fixing recesses to be engaged with corresponding ones of the positioning and fixing projections, the mounting holes, the positioning and fixing projections, and the positioning and fixing recesses being formed at predetermined circumferential intervals.

5. A swing bearing according to claim 4, wherein
   the outer ring is configured such that the two split rings of the outer ring are fixed together while the first flat disks of the split rings of the outer ring are in contact with each other with the first flange portions of the split rings of the outer ring extending in axially opposite directions and with the projections formed on one split ring of the outer ring being engaged with corresponding recesses formed in the other split ring of the outer ring, and
   the inner ring is configured such that the two split rings of the inner ring are fixed together while the second flat disks of the split rings of the inner ring are in contact with each other with the second flange portions of the split rings of the inner ring extending in axially opposite directions and with the projections formed on one split ring of the inner ring being engaged with corresponding recesses formed in the other split ring of the inner ring.

6. A swing bearing according to claim 1, wherein the rolling elements are rollers, and each of the first track forming portions and the second track forming portions has a conical surface, so that each of the first raceway groove and the second raceway groove has a raceway surface having an approximately V-shaped cross section.

7. A swing bearing according to claim 6, wherein the swing bearing is a cross roller bearing configured such that the rollers circumferentially adjacent to each other are disposed one after another in the load-carrying race with their axes of rotation intersecting with each other and wherein separators are disposed between the rollers, or the rollers are retained by a retainer.

8. A swing bearing according to claim 1, wherein the rolling elements are balls, and each of the first track forming portions and the second track forming portions has an arcuate surface, so that each of the first raceway groove and the second raceway groove has a raceway surface having an approximately semicircular cross section.

* * * * *